May 21, 1957 — A. E. ENGELDER — 2,792,828
APPARATUS FOR DETERMINING METABOLIC RATES
Filed April 13, 1953 — 3 Sheets-Sheet 1
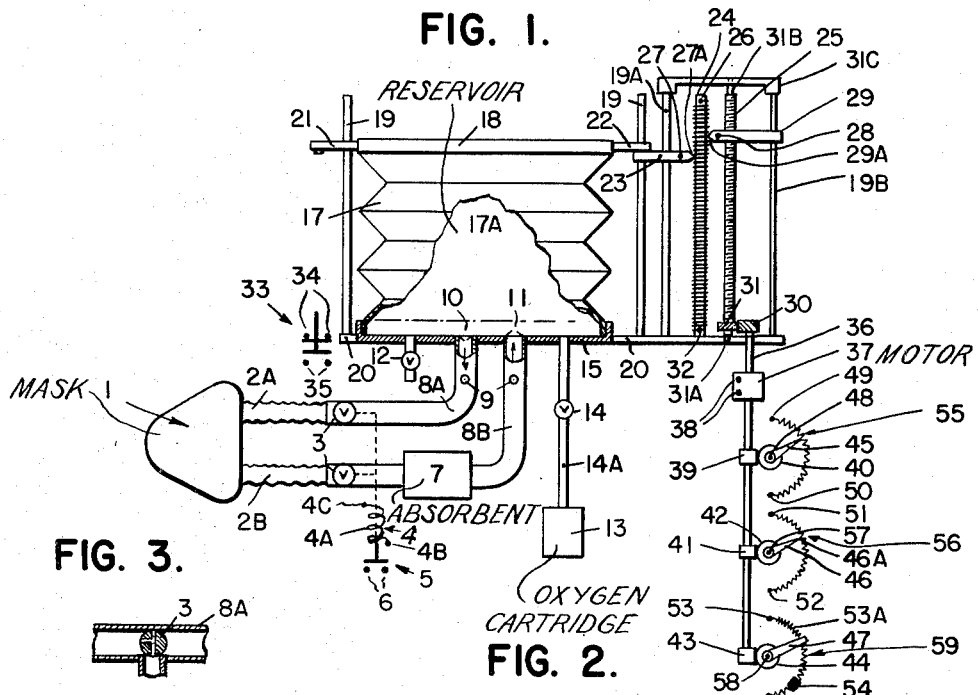
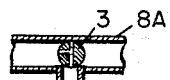
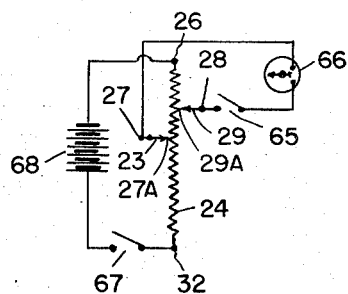
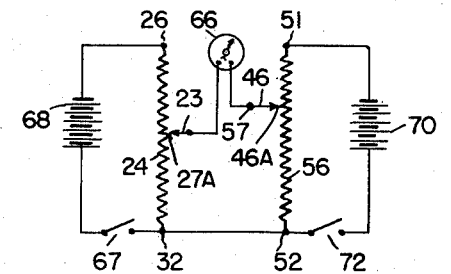
INVENTOR
ARTHUR E. ENGELDER
BY
ATTORNEY May 21, 1957  A. E. ENGELDER  2,792,828
APPARATUS FOR DETERMINING METABOLIC RATES
Filed April 13, 1953  3 Sheets-Sheet 2

INVENTOR
ARTHUR E. ENGELDER
BY
ATTORNEY

May 21, 1957  A. E. ENGELDER  2,792,828
APPARATUS FOR DETERMINING METABOLIC RATES
Filed April 13, 1953  3 Sheets-Sheet 3
FIG. 8.
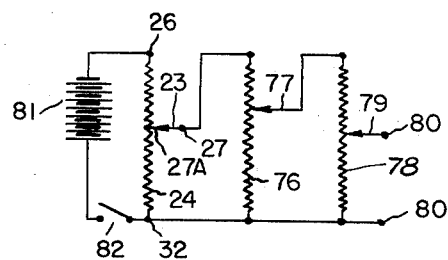
FIG. 9.
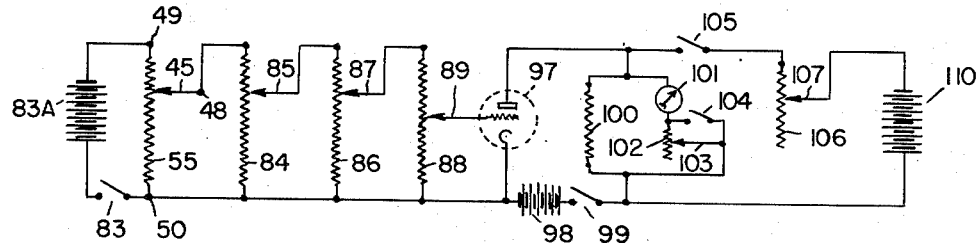
FIG. 10.
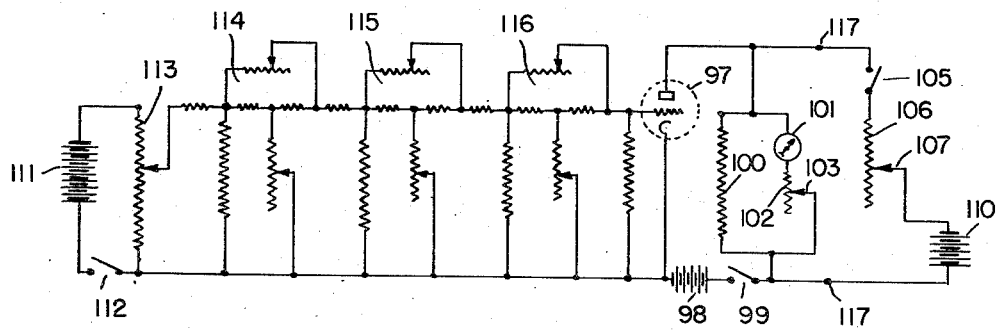
FIG. 11.
FIG. 12.
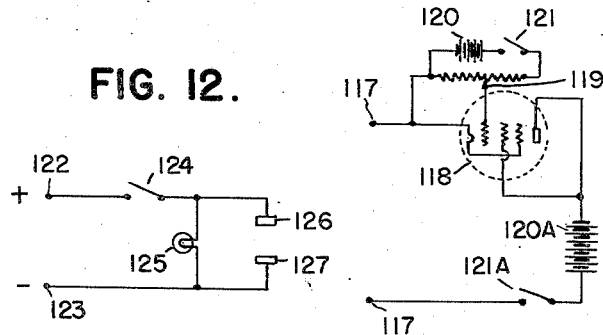
INVENTOR
ARTHUR E. ENGELDER
BY
ATTORNEY

United States Patent Office 2,792,828
Patented May 21, 1957

2,792,828

APPARATUS FOR DETERMINING METABOLIC RATES

Arthur E. Engelder, Morenci, Ariz.

Application April 13, 1953, Serial No. 348,259

30 Claims. (Cl. 128—2.07)

The present invention relates to an apparatus for determining metabolic rates in general, and particularly to an apparatus capable of determining metabolic rates, basal or otherwise, expressed in absolute or relative values, or both, especially for human subjects.

This application constitutes a continuation, in part, of application Serial No. 788,479, filed November 28, 1947, and now abandoned, by the present inventor, and entitled Apparatus for Determining Metabolic Rates.

The metabolic rate of an individual is an important indication of his state of health. It is a measurable factor capable of wide application by the physician in the differential diagnosis of several well-known diseases, in the critical evaluation of many marginal and abnormal physiological states, and is, moreover, highly useful in the proper regulation of treatment in certain metabolic diseases.

The metabolic rate of an individual is an expression of his energy expenditure under stated conditions, whatever they may be for the particular situation under consideration; while the basal metabolic rate, measured under specified and readily reproducible limiting conditions, is that rate of energy which the individual expends while at complete rest at constant temperature under physically comfortable circumstances, and in the post-absorbtive condition, that is, twelve or more hours following an ordinary meal.

The common and accepted manner of determining the metabolic rate of a subject with accuracy comprises measuring his oxygen consumption rate, computing his surface area from other available data, and expressing the metabolic rate conventionally in calories per square meter of body surface per hour. From this result and from a knowledge of the standard metabolic rates for normal persons of the same age and sex, the deviation of the test subject's rate from the standard basal metabolic rate also can be determined.

Generally, metabolic rates, particularly basal rates, are calculated upon the assumption that the test subject's respiratory quotient, which may be expressed as (1) $$RQ = \frac{CO_2}{O_2}$$

where $RQ$ = respiratory quotient
$CO_2$ = carbon dioxide exhaled
$O_2$ = oxygen inhaled has a value of 0.82. This assumption is valid and is universally accepted for routine clinical purposes. At this RQ the caloric value of oxygen in the human subject is 4.825 calories per litre of $O_2$ at standard conditions of gas temperature and pressure (N. T. P.).

The surface area of the subject's body, being a factor of prime importance, can be calculated from several empirical formulae, one widely used formula relating the subject's body surface area to his height and weight in the following manner:

(2) $$A = KH^{0.725}W^{0.425}$$

where A is the surface area in square meters, H the height in centimeters, and W the weight in kilograms, and K a constant of 0.007184 in adults and 0.007850 in infants.

In utilizing the gas equations which are incorporated in the equations of metabolic rate, it is commonly accepted practice to reduce the gas volume to N. T. P., that is, standard conditions of pressure and temperature comprising 760 millimeters of mercury and zero degrees centigrade. A volume of gas at any given pressure and temperature is reducible to its equivalent at N. T. P. according to the following:

(3) $$V = P_{\text{barometer}} \cdot \frac{273}{760 \cdot T} \cdot V_{\text{measured}}$$

where V is the volume of gas reduced to N. T. P., $V_{\text{measured}}$ is the volume of the gas as measured at room temperature T in absolute units, and $P_{\text{barometer}}$ is the ambient barometric pressure.

The usual expression of basal metabolic rate as the deviation of the test subject's basal rate from the well established standard rate for the appropriate age and sex can be calculated from the formulae: $D = M_{\text{obs}} - M_s$, or expressed in percentage:

(4) $$D_{\text{percent}} = 100 \frac{(M_{\text{obs}} - M_s)}{M_s}$$

where $D_{\text{percent}}$ is the deviation in percent, $M_{\text{obs}}$ the observed metabolic rate of the test subject, and $M_s$ the standard rate for the appropriate age and sex from reliable statistical data.

The equation for observed metabolic rate relating the factors of oxygen consumption, time, and surface area of the test subject may be written as follows:

(5) $$M_{\text{obs}} = \frac{V_{O_2} \cdot C}{A\left(\frac{t}{60}\right)}$$

where C is the caloric equivalent of one litre of oxygen at N. T. P. At RQ=0.82, C has the value 4.825 calories, whereupon the elementary equation becomes (6) $$M_{\text{obs}} = \frac{4.825 \, V_{O_2}}{A\left(\frac{t}{60}\right)} = \frac{4.825 \, V_{O_2}(60)}{tA}$$

where $V_{O_2}$ is the oxygen consumption during the test in litres at N. T. P., $t$ is measured in minutes and A is the area of the subject in square meters.

In methods now in use these various equations must be solved by calculation or from tables, and in either case the result is subject to human error, is relatively slow, and is laborious. The apparatus for determining metabolic rates constructed in accordance with the present invention incorporates means for the solution of the various equations, all without the necessity of using charts, rules, graphs or calculators. According to the present invention the time required for the consumption of a definite volume of pure oxygen is accurately measured and is entered automatically into an electrical analog computer as a factor which may be either current, voltage, resistance, capacity or inductance or any workable combination thereof. Into the electrical computing device are also introduced the other factors which enter into the determination of the subject's metabolic rate, namely height, weight, sex and age, which factors may be impressed in the instrument by the setting of dials by the operator to agree with provided information.

In a preferred embodiment of the invention a measured quantity of pure oxygen, the volume of which is known at N. T. P., sealed under pressure in a small metallic container such as a cartridge or cylinder, is attached to an appropriate fitting in the apparatus for determining metabolic rates and the oxygen allowed to expand into an expansible gas reservoir. The latter is sealed but has inlet and outlet connections with valves which permit one-way flow of gas. It is this gas which is consumed by the test subject, the end of the test being indicated by the return of the gas reservoir to its initial position. The volume of the gas, being known at N. T. P., is independent of ambient temperature and pressure. At the end of the test appropriate pilot lights are lighted or indicating means actuated. It is to be understood that the oxygen supply may be other than a cartridge, as for example, a conventional oxygen tank or an electrolytic generator. The apparatus for determining metabolic rates constructed in accordance with the present invention also incorporates means by which corrections can be made when oxygen at room temperature and pressure is used instead of oxygen from a gravimetrically standardized cartridge.

Throughout the test the oxygen which is breathed by the test subject comes from the gas reservoir and the products of respiration are returned thereto, suitable means being provided to remove carbon dioxide and water vapor. At the conclusion of the test, the necessary data having been impressed into the computer circuit, the metabolic rate of the test subject in calories per square meter of body surface per hour is read directly and, if desired, the deviation of the subject's rate from the standard rate for a person of the same age and sex indicated. Means are also included in this apparatus for determining metabolic rate to make apparent any gross fluctuation in the oxygen consumption rate during a test.

With an understanding of the defects and shortcomings of the methods which have heretofore been used in the computation of the metabolic rate, it is an object of the invention to provide an improved process and apparatus by which certain factors determining the metabolic rate of a test subject are determined and automatically impressed as electrical factors in a computing circuit.

Another object is to provide a new and improved apparatus for determining metabolic rates in which the metabolic rate of the test subject can be determined by measuring the time required to consume a known volume of oxygen, and assigning an electrical value to this factor, which in cooperation with other factors electrically represented and impressed into the computer circuit, will automatically determine the metabolic rate of the subject.

Another object of the invention is to provide an apparatus for determining metabolic rates in which electrical equivalents are assigned to the various factors upon which a subject's metabolic rate is dependent to produce thereby a reading upon an electrical instrument of the determined rate.

A still further object of the invention is to provide an apparatus for determining the basal metabolism of the test subject which incorporates means by which the factors determining the metabolic rate are assigned electrical values, in certain instances by the operator and in other instances by the apparatus during the test of the subject, the resultant of the various factors giving the metabolic rate of the subject.

A still further object of the invention is to provide an electrical apparatus for determining metabolic rates in which oxygen from various sources can be used to determine the metabolic rate of the test subject by means of an electrical computer circuit in which the various factors determining the metabolic rate are impressed, either automatically or manually, to produce a direct reading of the subject's metabolic rate in calories per square meter of the subject's body surface per hour, and, if desired, as the deviation of the test subject's rate from the rate accepted as normal for a person of the same age and sex.

Still another object of the invention is to provide an apparatus to determine the metabolic rate of a test subject by the use of a small size, light weight and easily portable cartridge containing a known volume of oxygen at N. T. P., yet which is sufficiently flexible to permit the use of bulk oxygen from commercial tanks, electrolytic generators, or other sources.

These and other more specific objects will appear upon reading the following specification and claims and upon considering in connection therewith the drawings which relate thereto.

Referring now to the drawings in which preferred embodiments of the invention are illustrated:

Figure 1 is a diagrammatic representation of that portion of my invention in which the relevant data is set up electrically during the actual test of a patient, the parts being shown in position as during the run of a test;

Figure 2 is a schematic wiring diagram showing the control and indicator circuit comprising switches, pilot lights, master relay and timer motor in their relationship before a test is commenced.

Figure 3 shows the master oxygen valve in its off position, that is, with the patient breathing room air;

Figure 4 shows the valve of Figure 3 in the on position, with the patient breathing oxygen from the reservoir;

Figure 5 shows schematically a rate comparator circuit using a single source of current;

Figure 6 shows a rate comparator circuit which may be substituted for the circuit of Figure 5 and which uses two sources of electric current;

Figure 8 shows schematically a circuit for correcting the volume of oxygen consumed to standard temperature and pressure;

Figure 9 shows another schematic circuit of the master computer embodying a triode vacuum tube and in which the metabolic rate of the patient is measured in calories per square meter per hour and also as a deviation from the standard rate for persons of the same age and sex;

Figure 10 illustrates a circuit similar to that of Figure 9 in which attenuators are used in place of potentiometers;

Figure 11 shows schematically an auxiliary circuit for measuring deviation and using a pentode vacuum tube; and Figure 12 is a schematic diagram of an electrolytic oxygen generator.

Figure 7:
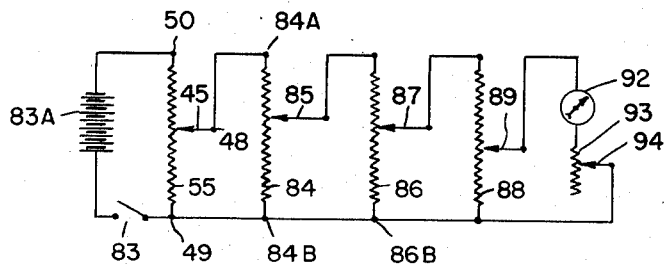
Figure 7 illustrates schematically the circuit of the analog computer in which the metabolic rate is determined in calories per square meter of patient's body.

Referring now to Figure 1 in particular, the element 17A comprises an oxygen reservoir having a fixed rigid base or bottom 15, expansible collapsible side walls 17 of rubber or other suitable material, and a rigid top 18.

The shape or configuration of the reservoir is not critical but must allow reproducible inflation and deflation, and the wall 17, which may be of rubber, plastic or thin metal, may be cylindrical or otherwise in shape, with corrugated or spiral folds. As will be apparent, however, the shape of the reservoir must be such that the linear displacement of the top 18 will be constantly proportional to the amount of oxygen consumed during the test. The size of reservoir 17A is not critical although it must be adequate for the volume of oxygen to be used. A volume of 2 or 3 litres is ample for tests of 10 or 15 minutes' duration for the average patient.

Reservoir 17A is gas tight, except for the flow permitted through valves 10, 11, 12 and 14, and the rigid top 18 is so balanced as to insure proper operation during respiration of the valves 10 and 11 which are of the differential pressure type. Reservoir top 18 carries rigid transversely extending arms 21 and 22 which move up and down with the top reflecting the change in volume of reservoir 17A consequent upon respiration. Their slotted ends are guided during such movement by two or more suitable guides which may comprise upright circular rods 19 rigidly fastened to a bracket 20 fixed to base 15. Arm 21 is for the purpose of operating a switch 33 when top 18 rests upon base 15 at the "zero" level, indicated by the dotted line in Figure 1, at the end of a test using a known volume of oxygen. Switch 33 may be conventional and has two normally closed contacts 34 and two normally open contacts 35. The second arm 22 carried by top 18 extends over a third arm 23 so that the latter is moved downwardly with each inhalation. For its part arm 23 is free to slide vertically in either direction on a guide 19 and a parallel guide 19A, sustained by slight friction between contact 27A and resistor 24. It may be adjusted manually, or moved downwardly by arm 22, a movement which does not materially interfere with the inhalation excursion of the reservoir top 18. At its outer end arm 23 carries the contact 27A, slidable upon movement of arm 23 along resistor 24. Arm 23 is also provided with a terminal 27 by which it is connected into electrical circuits later to be described. Resistor 24, which extends parallel to guides 19 and 19A, comprises a resistance wire wound upon a supporting mandrel and is provided at its ends with terminals 26 and 32. The guides 19 and 19A, as well as resistor 24, are rigidly supported by bracket 20 connected to base 15.

A rotary screw feed element 25 fixedly carries a gear 31 at its lower end in mesh with a worm 30. Element 25 is rotatably supported parallel to resistor 24 by a pin 31A in bracket 20 at its lower end and by a pin 31B carried by an arm 31C at its upper end. Worm gear 30 is fixed to a shaft 36 driven by a constant speed timing motor 37 and its rotation effects the rotation of screw 25. An arm 29 is guided for vertical movement upon still another vertical guide 19B and is provided with a threaded seat enclosing rotatable screw 25, the relationship being such that the arm is moved downwardly upon the rotation of the screw under the actuation of motor 37. Any common and suitable means may be provided to enable the arm 29 to be retracted vertically in a resetting operation. Arm 29 carries a contact 29A slidable along resistor 24 and is provided with a terminal 28 by which it is connected into electrical circuits as will be described.

Of the valves which have been referred to, valve 12 is an auxiliary valve used to empty reservoir 17A to its "zero" level. It can be of any conventional type, such as a petcock. Reservoir 17A could be emptied through flutter valve 10, but to preclude possible damage to the latter it is preferable that valve 12 be embodied. Both valves 10 and 11 are one-way flutter valves and are actuated by the slight pressure changes of normal respiration. Valve 10 is constructed and arranged to permit gas to leave reservoir 17A while valve 11 allows it to enter. Feed valve 14 is a conventional reduction type valve provided to admit oxygen into reservoir 17A.

Oxygen may be furnished to the reservoir in many ways but in the illustrated embodiment the supply is preferably a small cartridge 13, 2½ inches long by ¾ inch diameter, connected to the reservoir through conduit 14A and valve 14. Cartridge 13 contains a specified charge of compressed oxygen the volume of which is known at standard pressure and temperature, and it is this volume of oxygen which inflates reservoir 17A above the dotted "zero" line and is consumed by the test subject. Practically, cartridge 13 is charged with sufficient additional oxygen as to compensate for the volume left in the cartridge and in the connecting tubes 14A at the end of the test, for example approximately 10 cc. if a pressure in the order of 100 atmospheres is used in the original charge of cartridge 13. Heat may be applied in any conventional manner to the tubes 14A in order to bring the expanded oxygen to room temperature for immediate use. If desired, cartridge 13 may be replaced by a larger cylinder such as the commercial type tanks used on conventional metabolism instruments, or by a rechargeable low pressure tank for those tests based upon the volumetric measurement of oxygen consumed in a fixed time interval.

When the apparatus is connected to the patient by a suitable mask, helmet or mouthpiece, indicated diagrammatically at 1, all inhalations and exhalations will be conducted through gas-tight flexible tubes 2A and 2B to the control valves 3. The latter may take different forms, one acceptable type being shown diagrammatically in the off and on positions, respectively, in Figures 3 and 4. In the off position of both valves the patient breathes room air which is returned to the room. When valves 3 are in the on positions the patient breathes oxygen from reservoir 17A, the unused part being returned through canister 7 as will be described. A mechanical interlocking device of the plunger type, indicated generally by the reference character 4, is provided to insure that the valves are simultaneously in the on or off positions. Interlock 4 also operates a switch 5 which may be of any conventional type with normally open contacts 6, that is, contacts 6 are open when valves 3 are in the off positions as shown in Figure 3. The plunger of interlock 4 is electrically actuated by means of a coil 4A, the terminals 4B and 4C of which are connected in series with a master control switch 5A, illustrated schematically in Figure 2. The operation of switch 5 and master control switch 5A is hereinafter described. Rigid tubes 8A and 8B, forming continuations of tubes 2A and 2B, respectively, connect valves 3 with reservoir 17A, a canister 7 being positioned in line 8B and containing granular absorbent materials to remove carbon dioxide and water vapor exhaled by the subject. Carbon dioxide is completely removed by means of soda lime or sodium hydrate asbestos absorbent, and partial removal of water vapor is accomplished with calcium chloride. Taps 9 are provided in conduits 8A and 8B for manometer connections when it is desired to measure differential pressures during the respiratory cycle.

Timing motor 37 has been referred to as the driving means of shaft 36 and worm gear 30 and is shown as an electric motor having terminals 38. It is to be understood as being exemplary of any conventional constant speed prime mover. In addition to the worm gear 30 there are also keyed to shaft 36 spaced worm gears 39, 41 and 43 which mesh with gears 40, 42 and 44, respectively. Arms 45, 46 and 47 are attached to the latter gears with sufficient frictional force that they rotate therewith but the friction may be overcome manually to permit resetting.

Element 55 is a component of a variable resistor or potentiometer in the time network of the computer and is formed of resistance wire wound on a suitable mandrel between terminals 49 and 50 traversed by a contact arm 45 mounted on gear 40. The winding of resistance element 55 between terminals 49 and 50 will be governed by considerations, to be discussed in detail later, relating to the form in which the elementary metabolic rate equation is to be solved by the computer for those tests based upon the consumption of a known fixed volume of oxygen, such as that contained in cartridge 13. This is the chronometric solution of metabolic rates. The stationary terminal of contact arm 45 is indicated by the reference character 48.

A rate comparator element 56, shown as a resistor wound on a suitable form 55, is provided with end terminals 51 and 52, and is so shaped that contact arm 46 makes sliding contact therewith at 46A as it is moved by gear 42. The arm is provided with a fixed terminal 57. Element 56 is one component of the rate comparator circuit when two sources of current are used, as will be described.

In the diagrammatic showing of Figure 1, element 59 is a time switch operated by motor shaft 36 through worm 43 and gear 44. A current-conducting member 53A, which may be of brass or carbon, is provided at one end with a terminal 53, and the arm 47, having a stationary electrical terminal 58, makes sliding contact therewith under a pivoting force received from gear 44. A manually adjustable contact-lifting element 54, preferably of insulating material, is positioned upon member 53A and functions to lift contact arm 47 as it moves thereagainst to effect the breaking of the electric circuit.

Referring now to Figure 2 in particular, the control and indicator circuit is illustrated in its relationship before a test is begun. The terminals 38 of the driving motor 37 are seen to be connected to the current supply terminals 62, only the contacts 6 of switch 5 being in series therewith. The latter is controlled by the coil 4A of interlock 4 which is energized upon the closure of the series-connected master control switch 5A, the reservoir actuated switch 33, and the timing switch 59. The terminal 4B of the coil 4A is directly connected to terminal 53 of switch 59 while its second terminal 4C connects to the common wire leading to the incoming current terminal 62.

The terminals 62 are connected to a suitable source of power, such as a 120 volt 60 cycle lighting circuit, and a pilot lamp 60 is connected across the motor terminals 38 to indicate the application of voltage. A second indicator 61, which may be a pilot lamp or buzzer signal, is operated by the closing of contacts 35 of switch 33, which occurs as previously described, under the actuation of the arm 21 when the reservoir 17A is exhausted to its "zero" level. Contacts 34 open simultaneously with the closing of contacts 35, thus opening the circuit of interlock coil 4A. Thereupon contacts 6 of switch 5 are opened, the motor 38 is de-energized, and the test is terminated. The opening of contacts 53 and 58 of timing switch 59 will perform the same function, that is, open the circuit of coil 4A. This will occur provided adjustable element 54 is set on slide 53A for a time period less than that required for the container 17A to be emptied. Additionally, and upon the deenergization of interlock coil 4A which controls switch 5, valves 3 return to their off positions, or may be manually turned thereto.

In Figure 5 the rate comparator circuit including resistor 24 is shown schematically and, as will be described, make it possible to compare the rate of oxygen consumed during a test with an arbitrarily established steady rate. This circuit is provided to signal the operator of the apparatus if the subject is gasping or otherwise breathing irregularly, which would invalidate the test. Element 68 is a suitable source of E. M. F., such as a battery or a standard source of direct or alternating current, and is connected to the end terminals 26 and 32 of the resistor 24, a manually operated disconnecting switch 67 being in series therewith. One side of a meter 66, which may be a voltmeter or galvanometer, of the recording type if desired, is connected at 27 to sliding contact 27A, riding on resistance 24 and carried by arm 23. The opposite side of meter 66 is connected at 28 to the second sliding contact 29A which also rides on resistance 24, being carried on the second arm 29. A control switch 65 connected in series with meter 66 controls the flow of current thereto. Thus meter 66 will measure the voltage drop caused by current from source 68 through that portion of resistor 24 between sliding contacts 27A and 29A, that is, it will indicate the difference of potential between contacts 27A and 29A. It is to be remembered that contact 29A slides downward along resistor 24 at a constant speed, being actuated by the rotation of screw 25 which is itself actuated by constant speed motor 37. Its translation occurs at a constant rate and thus serves as a standard to which the subject's oxygen consumption rate may be compared. Contact 27A, on the other hand, slides downward with the deflation of the container 17A by increments reflecting the actual oxygen consumption of the test subject. Accordingly, if the rate of consumption of oxygen by the test subject is regular, the pointer of meter 66 will swing through the same range with each inhalation since during each inhalation the contact 27A is moved downwardly by arm 22, and immediately thereafter the meter pointer gradually returns to its original position as contact 29A is brought downward by screw 25. An unsatisfactory test, that is, a test in which the rate of oxygen consumption of the subject varies widely from interval to interval, will become immediately apparent by wide fluctuation of the pointer of meter 66 as distinguished from the steady swings characterizing regular respiration.

The schematic diagram of Figure 6 discloses an alternate rate comparator circuit which may be used instead of the circuit of Figure 5 and which uses two sources of current. The circuit is like that of Figure 5 except that the constant speed screw actuated sliding contact 29A is not embodied, being replaced by contact 46A driven by the timing motor shaft 36 as described. Element 56 is the resistor upon which contact 46A rides at a uniform rate, and element 70, connected to the terminals 51 and 52 of resistor 56, is a voltage source, here shown as a battery. In Figure 6, as in Figure 5, meter 66 indicates the difference of potential between the movable contacts, here contacts 27A and 46A. Contact 46A slides along resistor 56 simulating a uniform rate of oxygen consumption, as did contact 29A in Figure 5, and contact 27A slides on resistor 24 as previously described. It follows that the potential at contacts 27A and 46A will vary in the same manner as characterized contacts 27A and 29A in Figure 5, and the same indications are given thereby.

Before considering the analog computer devised specifically for the determination of metabolic rates, a detailed analysis of the metabolic equations will be undertaken in relation to the theory of electrical analog computers of the type here employed.

In that embodiment of the invention wherein a specific constant volume of oxygen is consumed, the variable (as shown by Equations 2, 5, and 6 set forth above) are height, weight, and time. When, however, the oxygen consumed is measured volumetrically two additional variables, barometric pressure and temperature, are necessarily introduced. In such instances the factor $V_{O_2}$ in Equation 6 is replaced by the expression given by Equation 3. It will also be noted that in Equations 5 and 6, the RQ is specified as 0.82 and accordingly C, the caloric equivalent of oxygen, has the value 4.825 calories per litre oxygen at N. T. P. For routine clinical work this assumption is valid, but for more exacting determinations and for research work it may not be desired to make the assumption that RQ is .82. In such an event, the RQ becomes an additional variable and may be substituted for C in Equation 5 by use of the expression $C = 1.23RQ + 3.817$. This expression relating C and RQ is derived from published experimental data, and shows that the relationship between C and RQ is linear.

All of the variables mentioned in the previous paragraph are represented in the following fundamental equation for metabolic rate:

$$(7) \quad M_{obs} = K \frac{P(1.23RQ + 3.817)V_{meas}}{tH^{0.725}W^{0.425}T}$$

where:

$M_{obs}$ is the metabolic rate in calories per square meter of body surface per hour,
P is the ambient barometric pressure,
RQ is the respiratory quotient given by Equation 1,
$V_{meas}$ is the volume in litres of oxygen consumed, and which is constant in one form of the invention,
t is time in minutes necessary to consume the volume $V_{meas}$ of oxygen, and which is constant in a second form of the invention,
H is the height of the subject, in centimeters,
W is the weight of the subject, in kilograms,
T is the room temperature in absolute units, and
K is a constant which incorporates the various constants enumerated in the equations, and also the factor 60 for changing time in minutes to time in hours. This constant is provided for, as is common in analog computer design, during calibration of the computer as will be subsequently described.

In the present apparatus it is desirable, because of practical considerations, to utilize the fundamental Equation 7 in its reciprocal form:

$$(8) \quad \frac{1}{M_{obs}} = \frac{tH^{0.725}W^{0.425}T}{KP(1.23RQ + 3.817)V_{meas}}$$

The variables of Equation 8 are represented in the analog computer of this invention by corresponding voltages, commonly denoted machine variables in computer terminology. In each case a simple transformation equation relates the problem variable to the machine variable by means of a dimensional coefficient termed the scale factor.

To generate such corresponding voltages or machine variables, a plurality of potentiometers, equal to the number of variables present in the equation being solved, are cascaded and connected to a suitable constant source of alternating or direct voltage. The output voltage of the system then represents the left hand member (dependent variable) of the equation being solved, which in Equation 8 is $$\frac{1}{M_{obs}}$$

In order to permit the use of relatively inexpensive standard linear potentiometers, the various exponential and reciprocal factors are represented by suitable non-linear or reverse scales as will be described in detail subsequently. The various constants in the equations are also represented in the calibrations of the potentiometers and of the meter which indicates the output voltage and thus the metabolic rate.

As previously indicated, it is desirable to utilize the reciprocal equation, Number 8, instead of Equation 7 because in a preferred form of the invention the RQ is assumed to be .82 and a standard volume of oxygen at N. T. P. is utilized so that the only variables appear in the numerator of the right hand member. The equation then is $$(9) \quad \frac{1}{M_{obs}} = \frac{tH^{0.725}W^{0.425}}{K_1}$$

where $K_1$ is a new constant which is provided for in the calibration of the system.

In the computer system, the machine variables corresponding to Equation 9 will be $$(10) \quad E_3 = E_0 t H^{0.725} W^{0.425}$$

where $E_3$ is the output voltage of a three-potentiometer system employed to solve Equation 9, and $E_0$ is the constant input voltage of the system.

It will be noted that voltage $E_3$ is proportional to $$\frac{1}{M_{obs}}$$

and not to $M_{obs}$ itself. However, the meter indicating voltage $E_3$ may be calibrated with a reverse scale, so that the meter reads metabolic rate directly.

The system of cascaded potentiometers is subject to an error known as a loading error. That this error may be made negligible, for practical purposes, will now be shown.

Assume that a constant voltage source having negligible impedance is employed to supply the voltage $E_0$ to a potentiometer of $R_1$ ohms, and that a linear relationship exists so that any dial setting "a" is a corresponding fraction of full scale. Also assume that the circuit is wired so that for $a=1$ (full scale) the output voltage $E_1$ of the potentiometer is equal to $E_0$. Then for any setting "a" the output $E_1$ will be $aE_0$ into an open circuit. The setting "a" is known as the transfer function of the potentiometer, or the ratio of output voltage to input voltage.

If the load is not open circuit but has a resistance $R_2$, then by Thevenin's theorem the equivalent circuit is a source $aE_0$ supplying $R_2$ through a series resistance comprising $aR_1$ and $(1-a)R_1$ connected in parallel, or $a(1-a)R_1$. (See Terman, Radio Engineering, third edition, pages 71 and 72.) The voltage applied to $R_2$ will then be $$aE_0 \frac{R_2}{R_2 + a(1-a)R_1}$$

instead of $aE_0$.

Considering the factor $$\frac{R_2}{R_2 + a(1-a)R_1}$$

or $$\frac{1}{1 + a(1-a)\frac{R_1}{R_2}}$$

it can be shown by differential calculus that the maximum value of $a(1-a)$ is at $a=\frac{1}{2}$, and at this value the factor becomes $$\frac{1}{1 + \frac{R_1}{4R_2}}$$

Thus the factor, which represents the loading error, may be reduced to any desired extent by making $4R_2$ large relative to $R_1$.

Accordingly, by making the first of the cascaded potentiometers of low resistance, and making successive potentiometers n times the resistance of the preceding one, the loading error may be made small enough for practical purposes as the system is here employed. The number n may range from 5 to 20. The error may also be reduced by employing only a limited portion of the scale of each potentiometer, such as from .8 to 1.0. This will permit lower ratios of $R_1$ to $R_2$ with the same limits of error.

Proceeding now with a detailed description of Figure 7, there is shown a schematic arrangement of the basic computer circuit designed to determine the metabolic rate of the test subject in calories per square meter of body surface per hour. This circuit is used when a constant volume of oxygen at N. T. P., such as contained in cartridge 13 in Figure 1, is used and time is an independent variable, that is, not definitely determined by the time switch 59. The circuit is connected to a suitable constant source of alternating or direct current, here shown as a battery 83A, which upon closure at the end of a test of a normally open manually operated switch 83 produces final recordings on a voltmeter or galvanometer 92. Meter 92 is calibrated to read in calories per square meter per hour as will be described.

Various factors are included in the determination, including the time required to consume the fixed volume of oxygen, and the height and weight of the subject. The circuit of Figure 7 also includes means for inserting the factor (1.23RQ+3.817) if it is desired to consider RQ as a variable. Figure 7 illustrates an analog computer which will solve the fundamental equation in terms of $t$, H, W, and RQ as independent variables, each inserted into the machine by a potentiometer whose transfer function in each case is conformable to the corresponding problem variable.

The resistor 55 in the circuit of Figure 7 has been discussed previously, its contact arm 45 being actuated at constant speed to increase the resistance from arm 45 to terminal 49. Accordingly, at the end of a test the resistance from arm 45 to terminal 49 is proportional to the time necessary for the subject to consume the fixed volume of oxygen, the resistance element being linear as indicated previously. Element 55 is directly calibrated with a linear scale that reads zero minutes when arm 45 is adjacent terminal 49, and any desired maximum number of minutes when arm 45 is adjacent terminal 50.

The potentiometer 84, connected across the output of element 55, is employed to insert the factor (1.23RQ+ 3.817) relating the caloric equivalent of oxygen with the respiratory quotient of the subject. Potentiometer 84 has a contact arm 85 which is manually adjustable to register with the proper mark on an adjacent scale calibrated to read the ordinary RQ range, from .707 to 1.0. It will be noted from Equation 8 that the RQ factor appears as a reciprocal, as distinguished from time, height and weight which appear in the numerator of the fraction. Since for purposes of economy of manufacture the potentiometer 84 is preferably a linear one, the reciprocal RQ factor is provided for by making the potentiometer scale reverse and non-linear. It follows that when the transfer function of the potentiometer 84 is unity, i. e. when arm 85 is adjacent terminal 84A, the corresponding RQ mark on the scale will be .707. Other values of RQ are then calculated from the expression

(11) $$a = \frac{1.23(.707)+3.817}{1.23RQ+3.817}$$

or, $$a = \frac{4.686}{1.23RQ+3.817}$$

where $a$ is the transfer function of potentiometer 84, and RQ is the respiratory quotient of the patient as given by Equation 1.

By use of the Equation 11, the RQ scale is readily calibrated by selecting an RQ value and marking it at the point on the potentiometer determined from the equation, the value of $a$ being known for each setting of contact arm 85. It will be noted that Equation 11 represents the ratio of the caloric equivalent of oxygen at minimum RQ to the caloric equivalent of oxygen at the RQ selected. For RQ=unity, the value of the transfer function as determined from Equation 11 is approximately .93, which means that only 7 percent of range of potentiometer 84 is utilized. The utilization of only a small part of the potentiometer range results in certain practical advantages, one of which is that the resistance of adjacent potentiometers need not be substantially different from the resistance of potentiometer 84 in order to maintain the previously discussed loading error within the desired limits.

Potentiometer 86, which is connected across the output of potentiometer 84 and has a manually adjustable contact arm 87, is used to insert a factor in the overall transfer function of the computer which is directly proportional to the effect of height in the Equations 8 and 9. Although potentiometer 86 is itself linear, a non-linear scale is employed to introduce the effect of the height exponent 0.725. As in the case of the potentiometer 84 it is necessary, in calibrating potentiometer 86, to consider the operating limits of the computer as well as whether the height factor appears in the numerator or denominator of Equations 8 and 9. Since, conversely to the situation for RQ, height appears in the numerator of these expressions and is not a reciprocal, the maximum height will correspond to a transfer function of unity. Accordingly, a maximum height index, here taken as 200 centimeters, will be marked adjacent the upper end of potentiometer 86 as seen in Figure 7. All remaining calibrations on the potentiometer 86 scale may then be calculated in accordance with the equation

(12) $$a = \left(\frac{H}{200}\right)^{0.725}$$

where $a$ is the transfer function of the potentiometer at any particular setting corresponding to a height index H.

Potentiometer 88, having an adjustable arm 89, is connected to the output of potentiometer 86 and corresponds thereto except that it is adapted to insert the weight factor instead of the height factor. Selecting 175 kilograms as the maximum weight limit for the computer, the 175 kilogram mark will be placed at the upper end of the potentiometer, at which setting of arm 89 the transfer function is unity. The remaining points on the scale may then be calculated from the expression

(13) $$a = \left(\frac{W}{175}\right)^{0.425}$$

where $a$ is the transfer function of the potentiometer at any setting where it is desired to mark a corresponding weight index W.

The deflection of meter 92 will be proportional to the output voltage of the potentiometer 88 to which it is connected. This output voltage is equal, within easily definable limits, to the product of the transfer functions of potentiometers 55, 84, 86 and 88 multiplied by the supply voltage from constant voltage source 83A. From Equations 8 and 9 it may be seen that the output voltage read by meter 92 is inversely proportional to metabolic rate, which is provided for by calibrating meter 92 with a reverse scale in the following manner.

When the transfer functions of potentiometers 55, 84, 86 and 88 are all unity, the meter 92 will read full scale. Thus, if the scale of potentiometer 55 is calibrated for a maximum reading of, for example, 15 minutes, the full scale meter reading will be the metabolic rate of a subject who weighs 175 kilograms, is 200 centimeters tall, has an RQ of .707 and requires 15 minutes to consume the standard oxygen charge. This metabolic rate may be calculated from the previously given equations, for example Equation 7, and the solution marked at the full scale point on meter 92. In like manner, the potentiometers 55, 84, 86 and 88 may be set to any desired intermediate points on their respective scales, and the solution for such points calculated and marked on meter 92 at the place where the needle thereof concurrently registers.

To insure that the effective voltage from source 83a is the same for any test as when the computer was calibrated at the factory, a variable resistor 93 having contact arm 94 is connected in series with meter 92. Prior to each test, the arm 94 is adjusted in a manner to make meter 92 read full scale when all potentiometers are set for unity transfer function, thereby duplicating the conditions present during calibration.

Resistor 93 of meter 92 may be provided with definite steps which would permit of more than one scale on the meter. This would facilitate readings and improve accuracy where the volume of oxygen consumed is greatly different as, for example, in infants and in adults. Also, the reservoir 17A of Figure 1 could be of different sizes for different sized test subjects, and could be inflated to different volumes for different sized test subjects, and the appropriate scale for meter 92 would then be used.

Instead of employing linear mandrels for the potentiometers 55, 84, 86 and 88 previously described, the various potentiometers in the computing circuits of the invention may be of any suitable tapered or otherwise non-linear variety. With such potentiometers the various scales may, if desired, be linear and direct instead of non-linear or reversed as described in connection with the potentiometers 84, 86 and 88. It is also within the scope of the invention to employ the direct equation (7) instead of the reciprocal equations (8) and (9) in obtaining the solution, in which event the output voltage read by meter 92 would be directly proportional to metabolic rate instead of inversely proportional thereto.

Figure 8A:
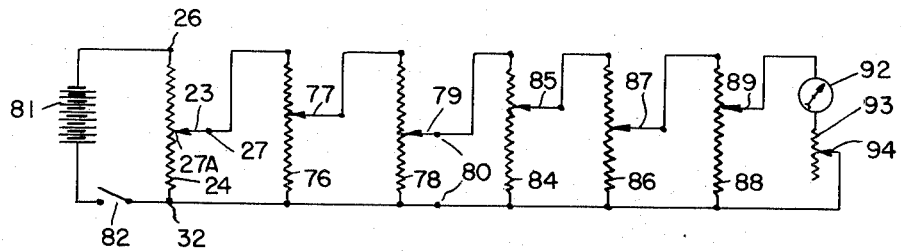
Figure 8A shows schematically the analog computer circuit which computes the metabolic rate of a patient in calories per square meter per hour when the element of time is the predetermined constant, the volume of oxygen consumed being measured at ambient temperature and pressure and being the definitive variable.

As previously stated, the circuit of Figure 7 is employed where a standard volume of oxygen at NTP is consumed by the patient, and time is the measured independent variable. There will now be considered the type of operation where a variable amount of oxygen is consumed during a constant or standard period of time. Referring to Figures 8 and 8A, it will be noted that the time resistor or potentiometer 55 of Figure 7 is replaced by the resistor 24 (Figure 1) having a cooperating arm 23 and sliding contact 27a which varies the effective resistance of resistor 24 in direct proportion to the volume of oxygen withdrawn from reservoir 17A.

In Figure 8, the resistor 24 is shown connected in the "volume correction" circuit which corrects the volume of oxygen consumed at room conditions to the corresponding volume at standard conditions, that is, at a pressure of 760 millimeters of mercury and at 0° centigrade. In the operation of the unit with cartridge 13, there is no need for the circuit of Figure 8. However, the circuit is provided in order to broaden the operating capabilities of the apparatus and make possible the use of oxygen from a source unrelated to standard conditions.

Element 76 is shown as a resistor, wound to provide an impedance of a magnitude to affect the circuit in a manner corresponding to the effect of barometric pressure, and having an adjustable arm 77 adapted to be actuated by a conventional aneroid barometric unit, or which may be set manually to the observed pressure. Element 78 comprises a resistor wound to provide an impedance of a magnitude to affect the circuit in a manner corresponding to the effect of temperature, its arm 79 being adapted to be actuated by an unshown conventional thermometric unit, or set manually to correspond to the ambient temperature. Terminals 80 will have a voltage between them of a magnitude corresponding to the volume of oxygen consumed from the reservoir 17A corrected to standard conditions. A manually operated disconnecting switch 82 is provided in series with the constant source 81 of alternating or direct voltage, so that the circuit may be opened after a voltage reading is taken.

As in the case of the circuit of Figure 7, the resistors or potentiometers 76 and 78 are preferably linear. Since the temperature appears as a direct factor in Equation 8, the calibration of potentiometer 78 will be a direct one and may be readily made in accordance with the principles previously discussed. Pressure, however, appears as a reciprocal in Equation 8, so that the calibration of potentiometer 76 will be reverse, as was discussed in reference to potentiometer 84 of Figure 7.

Referring now to Figure 8A in particular, a modified circuit is disclosed which comprises a combination of the circuits of Figures 7 and 8, with the battery 83A and the time resistor 55 of Figure 7 omitted. The terminals 80 of Figure 8, the voltage of which corresponds to the volume of oxygen consumed corrected to standard conditions, are connected across the potentiometer 84 of Figure 7. As the volume of oxygen at standard conditions represents a fixed number of calories, the voltage at terminals 80 at the end of the test is also proportional to the calories expended by the test subject in the time period of the test, which in this case would be a fixed definite time determined by the setting of the switch 59 in Figure 1. With the introduction of elements 84, 86 and 88 in the manner shown in Figure 8A, meter 92 may be calibrated in the manner previously discussed, to read in cal./sq. m./hr. for different values of RQ and for varying physical sizes of test subjects.

Figure 8B:
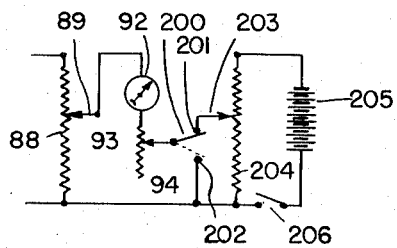
Figure 8B represents schematically a circuit which will introduce data corresponding to standard rates into a master computer circuit and so determine the observed metabolic rate of the subject as a deviation, plus or minus, from the standard rate appropriate for the same age and sex.

In Figure 8B is shown a supplemental circuit to introduce into the computer shown schematically in Figure 7 or 8A the combined factors of age and sex, thereby indicating the deviation of the observed metabolic rate, as given by the previously described section of the computer, from that rate considered standard for the appropriate age and sex. Element 204 is a potentiometer which can be set to introduce into the potentiometric system of the computer an opposing voltage representing the accepted standard metabolic rate appropriate to the age and sex of the subject. Element 205 is a suitable source of E. M. F., and is shown as a battery the current flow of which is controlled by a manually operated switch 206. Element 204 is provided with a sliding contact 203 adapted to be set manually to correspond to the age and sex of the test subject, and there is also provided a conventional single pole, double throw switch 200 adapted to close on arm 203, and so include the age and sex factor, or to close on stationary contact 202 and so exclude it. The dial of potentiometer 204 is calibrated in years, there being one age scale for males and a separate age scale for females based on standard metabolic rates for various ages.

When switch 206 is closed an electric current will flow through element 204 and arm 203, which is adjustable and set manually so that its potential corresponds to the standard metabolic rate in cal./sq. m./hr. for a person of the same age and sex as the test subject. The potential of arm 89, of course, corresponds to the actual metabolic rate of the patient; therefore when the opposing potential of arm 203 is applied to meter 92 through switch 200, meter 92 will reflect the difference in potential of arms 203 and 89, on a second scale calibrated to read deviation from the appropriate standard metabolic rate. Thus if the metabolic rate of the subject is normal, arms 203 and 89 will have the same potential and the meter will not deflect, thus reading zero deviation. Should the actual metabolic rate of the patient be greater or less than standard, meter 92 will deflect one way or the other and the meter can be read in deviation, positive or minus, from the standard metabolic rate.

Figure 8C:
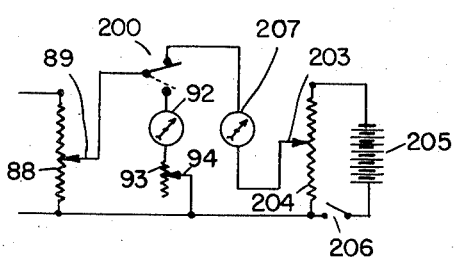
Figure 8C shows a circuit similar to that of Figure 8B but in which a second meter is used to read the deviation from standard, the first meter indicating the metabolic rate in calories per square meter per hour.

A modified deviation circuit is shown in Figure 8C which is basically like the circuit of Figure 8B except that a separate meter 207 is used to measure deviation from the appropriate standard rate, meter 92 indicating only cal./sq. m./hr. as in the circuits of Figures 7 and 8A. The opposing voltage is again obtained by means of potentiometer 204 and again represents standard metabolic rate for a subject of the same age and sex as the test patient, this potential being applied directly to meter 207. The potential of arm 89, corresponding to the actual metabolic rate of test subject, can be applied to either meter 92 or 207 depending upon the position of the double throw single pole switch 200. Meter 207 will reflect the potentials of arms 89 and 203 in the same manner as explained for meter 92 in the circuit of Figure 8B and is so calibrated that it will read deviation (plus or minus) from standard.

In Figure 9 elements 83A, 55, 84, 86 and 88 are connected as in Figure 7, with time being the definitive variable and a constant volume of oxygen at N. T. P. being again employed. The potential of arm 89, which is proportional to the test subject's rate in calories per square meter per hour, is applied to the grid of a triode 97.

Element 101 is a suitable meter, such as a voltmeter or galvanometer, with a resistance 102 in series. The latter is made variable by arm 103 which may be shorted out by switch 104. A resistance 100 is connected in parallel with meter 101, the resistances 100 and 102 having values that will afford proper deflection of the pointer of meter 101. A suitable potential is applied to the plate of triode 97 by a battery 98 through resistor 100 and meter 101 upon the closing of switch 99 in series with the battery. Meter 101 can be calibrated, as previously discussed, to read in cal./sq. m./hr.

Elements 106, 107 and 110 provide a voltage proportional to standard metabolic rate, element 106 being a resistor or potentiometer of suitable value and provided with variable arm 107 which may be manually set to correspond to the age and sex of the test subject in the manner of resistor 204 of Figures 8B and 8C. When switch 105 is closed the voltage of source 110 regulated by arm 107 is applied to the plate of triode 97 so that the meter will read deviation from standard metabolic rate on a suitable scale as did meter 92 in Figure 8B.

The potential of arm 89 in the circuit of Figure 9 described above is obtained as in the circuit of Figure 7 and is proportional to the metabolic rate in cal./sq. m./hr. as determined by the time required to consume a known and definite amount of oxygen, as for example that contained in cartridge 13. If, on the other hand, the duration of the test is fixed by time switch 59 in Figures 1 and 2, and the oxygen consumption is measured volumetrically as an independent variable, then the potential of arm 89 would be defined by the circuit of Figure 8A, again being proportional to the metabolic rate in cal./sq. m./hr. The potential of arm 89 applied to the grid of triode 97 controls, within the operating range of the tube, the current in the plate circuit and hence the voltage drop across resistance 100, which in turn is opposed by a voltage proportional to a standard rate, and meter 101 again reads the deviation.

Referring now to the schematic showing of Figure 10, attenuators are used in place of the resistors or potentiometers of Figure 9, the circuits otherwise being identical. Element 111 is a source of E. M. F. suitable for use in this computer circuit, the flow of current being controlled by a switch 112. Attenuator elements 113, 114, 115 and 116 are utilized in place of elements 55, 84, 86 and 88, respectively, of Figure 9, to provide the grid potential of triode 97, and meter 101 is connected in the triode circuit and will read as described in connection with Figure 9. The showing of the attenuators in Figure 10 of the drawings is merely symbolic and is not intended to show in detail the construction of the attenuator elements, which are preferably of the conventional T-type in which a control shaft continuously varies the series and shunt arms simultaneously so as to produce predetermined ratios of attenuation of current and voltage while maintaining a constant input and output resistance. As is well known in a T attenuator, the series arms are zero and the shunt arm opens at no loss, while at infinite loss the shunt arm becomes zero and the two series arms are equal to the resistance level at which the attenuator is designed to operate. Interaction errors inherent in cascaded potentiometer systems are eliminated completely without the use of excessively high or low values of resistance which may be required in a long chain of cascaded potentiometers. It should be noted that the variable arms of each of the attenuators 114, 115 and 116 are to be gang operated and are mechanically connected for this purpose. A voltage proportional to standard metabolic rate for the appropriate age and sex is supplied in the present instance by attenuator 106 from its adjustable arm 107, battery 110 and switch 105, functionally similar to the parts carrying the same characters in Figure 9, and again connected across the meter 101, here by leads indicated by the reference character 117.

The schematic wiring of the analog computer circuit shown in Figure 10 is intended for use when a cartridge of oxygen is used but here again, if bulk oxygen is used, the circuit of Figure 8A with the potentiometers replaced by attenuators, could be employed to obtain the voltage introduced at the grid of triode 97 instead of the circuit of Figure 7. Meter 101 will read the metabolic rate as above described, in cal./sq. m./hr. or deviation from standard rate.

In Figure 11 a pentode vacuum tube 118 is shown embodied in a cathode follower circuit to introduce standard rate as a machine variable in terms of age and sex. This may be connected at points 117 of Figure 10 to replace the previously discussed standard rate networks to the right of those points. In the circuit of Figure 11 arm 119 is set for the age and sex of the test subject, and elements 120 and 120A are additional suitable voltage sources which may be connected into the circuit by closing switches 121 and 121A. Meter 101 in the modified Figure 10 circuits will read as described in connection with that figure.

Figure 12 discloses an oxygen generator circuit in which elements 122 and 123 are respectively the positive and negative terminals of a suitable direct current source, as for example a rectifier. Elements 126 and 127 are the anode and cathode to be immersed in a suitable electrolyte, such as water, to which may be added an ionizing agent, as for example, salt, to facilitate the passage of electric current. Elements 126 and 127 are connected to points 122 and 123, respectively, and a pilot light 125 in parallel therewith indicates the presence of a potential thereacross effected by the closing of the control switch 124 in series with both the light and the poles 126 and 127. Oxygen gas will be given off at anode 126 upon the flow of current through the electrolyte and is to be collected in a suitable chamber for use in metabolic tests. Hydrogen gas will be given off at cathode 127 and may be collected in a suitable chamber as a by-product.

Before describing specifically and in detail the operation of the invention a general statement of procedure may be helpful. The test can be commenced at any time by the operator when he ascertains that the subject is well accustomed to the face mask, helmet or mouthpiece. In fact, the patient will breathe room air until the actual test run is begun and he will be unaware of the transition from room air to oxygen when valve 3 is turned. This is highly desirable since experience has amply indicated that best results are invariably obtained when the subject is relaxed, unafraid, and not aware that the test is under way. Psychological elements are then reduced to a minimum level, a condition not always realized with conventional instruments.

Before control valves 3 are turned to the test position the computer should be cleared and the appropriate settings made for the subject. When the actual test is begun valves 3 and the timing switch are actuated synchronously, either by the operator or electrically. When the charge of oxygen is consumed the test is terminated automatically and the subject again breathes room air. This transition likewise will pass unnoticed by him. Upon termination of the test by return of the reservoir top to its initial position the timer is stopped automatically, and the time required by the subject to consume the specific volume of oxygen will have been set-up in the computer as a machine variable by the timer in terms of the voltage output from element 55.

The subject may continue to breath room air through the mask, or the latter may be removed. All necessary and sufficient data have now been supplied the computer, and the operator may then proceed to close switch 83 (Figure 7) for a reading. If the time and RQ elements alone are utilized, as by short circuiting the other potentiometers, the operator is able to read the total energy exchange represented by the particular test in calories per hour.

The next step involves the utilization of the height and weight elements whose insertion into the circuit causes the meter to indicate the metabolic rate of the subject in calories per hour per square meter of body surface, that is to say, in absolute units.

Lastly, by actuating the circuits on which age and sex data have been set, the operator will obtain the relative basal metabolic rate as a deviation of the test subject's rate from that which is considered standard for the appropriate age and sex.

The specific operation of an apparatus for determining metabolic rates constructed in accordance with the present invention will first be described for the type of operation in which a known volume of oxygen at conditions of standard pressure and temperature is consumed by the test subject during a time interval which is measured by the instrument. Referring again to Figure 1, to prepare the apparatus for a test the valve 12 is opened to allow top 18 of reservoir 17A to assume the "zero" level, indicated by the dotted line, and switch 33 is properly positioned to be actuated by arm 21 as described later. Valve 12 is then closed and master control switch 5A opened, a suitable source of electric current being applied to terminals 62. A cartridge of oxygen 13, containing the predetermined and required volume of oxygen for the test, is then connected to valve 14, valve 14 is opened, and reservoir 17A becomes inflated with oxygen from the cartridge. Valve 14 is then closed and the cartridge 13 removed. In the open position of switch 5A coil 4A is unexcited and both valves 3 are in the off position, as shown in Figure 3, and the test subject must breathe ambient air and exhale to the atmosphere, all switches, pilot lights, etc. being related as shown in Figure 2.

Contact carrying arms 29 and 23 are now raised manually to their starting positions shown in Figure 1. Arm 45 of timing resistor 55 is set manually in its starting or "beginning of test" position in which it makes contact with terminal 49. Arm 46 of rate comparator resistor 56 is set manually at its starting position in which it makes contact with terminal 51, and the contact lifting element 54 of time switch 59, which functions to lift the contact as it moves thereagainst, is set in an inoperative position since it will not be used in this test procedure. In this test, then, contacts 53 and 58 will remain closed through arm 47 throughout the test.

The rate comparator circuit of Figure 5 is energized by closing switches 65 and 67, meter 66 reading approximately zero as contacts 27A and 29A on arms 28 and 29 are at the same vertical height on resistor 24.

The mask or helmet 1 is now fitted over the test subject's face or head so that all breathing takes place through tubes 2A, 2B and valves 3, the subject continuing to breathe room air. Element 7 has been previously filled with carbon-dioxide-absorbing or carbon-dioxide-and-water-absorbing materials, and all is in readiness to begin the test.

Master control switch 5A in Figure 2 is now closed and master interconnector coil 4A (Figures 1 and 2) is energized through a circuit across the leads 62 which includes, in addition to switch 5A, the normally closed contacts 34, 34 of switch 33, time switch 59 including its contacts 53 and 58. Thereupon the plunger of servo (or relay) 4 is moved by coil 4A to effect the operation of valves 3, or they may be moved manually, to the position shown in Figure 4 so that ducts 2A and 2B are connected to ducts 8A and 8B and the subject will accordingly breathe oxygen from reservoir 17A. The movement of the plunger of interlock 4 also actuates switch 5 to close contacts 6 thereby placing the voltage of terminals 62 across the terminals 38 of timing motor 37. The motor, now energized, begins to operate, the simultaneous lighting of the pilot lamp 60 indicating that the test is in progress.

With the rotation of timing motor shaft 36 arms 45, 46 and 47 are rotated at a uniform speed in a clockwise direction, and screw 25 is turned to move arm 29 downwardly at a uniform speed. The first inhalation of the test subject takes oxygen from reservoir 17A, whereupon top 18 and arm 22 drop a distance corresponding to the gas removed which will vary with the depth of breathing of the subject. Arm 22 rides upon arm 23 and moves the latter downwardly the same distance. This causes a swing of the pointer of meter 66 in the rate comparator circuit of Figure 5 in proportion to the distance moved by arm 23 because of the voltage drop in that portion of resistor 25 which has just been inserted between contacts 27A and 29A. Between breaths the pointer of meter 66 will gradually move toward its initial position as the length of the resistor 24 between contacts 27A and 29A shortens with the constant speed downward movement of arm 29 and its contact 29A. With each breath, however, the pointer will swing through a distance proportional to the volume of oxygen consumed. It is clear that erratic swinging of the pointer of meter 66 will indicate an erratic or irregular consumption of oxygen by the subject.

If the circuit of Figure 5 is used as a rate comparator, resistor 56 of Figure 1 need not be employed. If instead the circuit shown in Figure 6 is used as the rate comparator circuit, screw 25 and arm 29 may be omitted and the operation will be as described above in connection with Figure 6.

As the subject breathes oxygen from reservoir 17A the exhalations from the subject's lungs, including unused oxygen, is returned to the reservoir, carbon dioxide and water vapor being absorbed by filter 7. When all of the added oxygen in reservoir 17A is consumed its top 18 returns to the "zero" level and arm 21 opens contacts 34 of switch 33 and simultaneously closes contacts 35. (See Figures 1 and 2). The opening of contacts 34 opens the circuits of master relay coil 4A and its plunger 4 moves back to its normal position which it obtained before closing of master control switch 5A. This return of element 4 causes switch 5 to open its contacts 6 to de-energize timer motor 37 and extinguish pilot 60. The return of element 4 to its normal position will simultaneously restore valves 3 to their off positions, shown in Figure 3, and the test subject again breathes room air. At the same time element 61, which may be a pilot light or buzzer signal, will be activated by the closing of contacts 35 of switch 33 by plunger 4 to indicate the end of the test period. The subject may now be relieved of the mask or helmet and master control switch 5A may be opened at the convenience of the operator, the test having been stopped automatically.

Referring now particularly to Figure 7 illustrating the basic computer circuit, at the conclusion of the test arm 45 of resistor or potentiometer 55 has been moved by timer motor 37 from its initial starting position on terminal 49 to a position which inserts resistance between itself and that terminal proportional to the time required for the test subject to consume the known quantity of oxygen originally contained in cartridge 13. Arm 85 of resistor or potentiometer 84 is set manually for the selected value of RQ, usually 0.82 for clinical basal metabolism tests, and arms 87 and 89 of units 86 and 88, respectively, are set in accordance with the height and weight of the test subject on suitably calibrated scales. Switch 83 is now closed and the e. m. f. of element 83A is applied to the analog computer circuit, the metabolic rate in calories per square meter of body surface of the test subject per hour can then be read directly upon the meter 92.

It being desired to determine the deviation of the test subject's rate from the standard rate corresponding to his age and sex, the standard rate set-up in Figure 8B is introduced into the computer circuit of Figure 8A. The combined circuit is identical to that of Figure 8A with the addition through switch 200 of resistor 204 with its adjustable arm 201, the battery 205 and its control switch 206. With the movable contact of switch 200 in position on 202 the last-mentioned circuit is excluded and the circuit is that of Figure 8A. With that movable contact seated on stationary contact 201, however, the standard rate circuit is included. Sliding contact 203 is now set on resistor 204 to the scale calibration corresponding to the subject's sex and age and switch 206 is closed, whereupon the potential of arm 203 corresponds to the appropriate standard metabolic rate. Switch 200 is now moved to contact 201, switch 206 is closed, and meter 92 indicates the metabolic rate of the subject as a deviation, plus or minus, from the rate accepted as standard for persons of the same age and sex as the test subject.

Thus the apparatus for determining metabolic rates comprising the present invention will quickly perform electrically the computation usually requiring much time and the aid of charts, graphs, correction tables, slide rules, nomograms and kymographic records which must be measured. Further, the "human equation" with its attendant margin for error, has been minimized with consequent improvement in accuracy and reliability.

In the event the complete computer circuit embodies the standard rate network of Figure 8C, rather than that of Figure 8B, the double throw switch 200 is connected between arm 89 and meter 92 in Figure 7. The setting of arm 203 is the same as described supra in connection with Figure 8B and the double throw switch 200 enables the operator to read either the rate in cal./sq.m./hr. on meter 92, or the mtabolic rate as a deviation from standard rate on the second meter 207.

In the event that bulk oxygen at room temperature and pressure is used in a test the preliminary operations are as above described. Reservoir 17A is first deflated, use being made of valve 12. Switch 33 will not be operative in this test. Master switch 5A is opened and a suitable source of current is connected to terminals 62 as before. A tank of bulk oxygen is obtained, for example, from the electrolytic oxygen generator, illustrated schematically in Figure 12, or from commercial sources, and connected at valve 14 in place of the cartridge 13 of the first test. Valve 14 is then opened and reservoir 17A inflated. The exact volume of oxygen introduced into reservoir 17A is not critical but must be sufficient as to provide the patient during the test, plus a sufficient volume to permit the test to end with top 18 above the dotted "zero" line of Figure 1 and so preclude operation of switch 33. Valve 14 is then closed and the bulk oxygen supply may be disconnected, there being no further need for it in this test. With master switch 5A (Figure 2) in the open position, all valves, switches, pilots, etc. will be in position as described at the beginning of the first test.

Again, arms 23, 29, 45 and 46 are set manually at their starting positions as previously described. In this test time switch 59 will function and arm 47 is set in starting contact at terminal 53 and the circuit-opening element 54 is so positioned as to open contacts 53 and 58 after the predetermined time period of the test, for example, six, eight, ten, or fifteen minutes. Absorbent member 7 is refilled, if necessary, the patient is equipped with mask or helmet 1, and the test apparatus is in readiness.

Master control switch 5A is closed and the test starts and continues with the equipment functioning exactly as described for the first test, except that when the predetermined test time has elapsed, arm 47 in the time switch 59 moves upon element 54 and is lifted so that contacts 53 and 58 are opened. The opening of contacts 53 and 58 opens the circuit between leads 62, 62 including coil 4A, previously described, and effects the de-energization of coil 4A and performs the same function and causes the same operation of equipment as described for the opening of contacts 34 in the first test. Element 61 is not functional in this case, however.

At the conclusion of this test arm 23, under the action of arm 22, has traversed resistance element 24 to a position corresponding to the volume of oxygen, at ambient temperature and pressure consumed by the subject during the preselected time of the test. In this case V is the problem variable and the voltage output of potentiometer 24 is the corresponding machine variable. Potentiometer 24, with its arm 23 set by the fall of arm 22 during the test, is effective in the analog computer circuit shown schematically in Figure 8A. Arm 77 of element 76 is set by means of an aneroid barometer, or manually, to correspond to the existing barometric pressure and arm 79 of element 78 is set thermometrically, or manually, to correspond to ambient room temperature for reduction of the volumetric measurement to standard condition. Arms 85, 87 and 89 are set as described in the first test to correspond with the RQ, height and weight data. Switch 82 is now closed and the E. M. F. of source 81 is applied to the master computer circuit. The metabolic rate is then readable on meter 92 in cal./sq.m./hr.

A machine voltage representing standard rate from either Figure 8B or Figure 8C may be introduced into the computer in exactly the same manner as described for the first test, and the metabolic rate of the subject read on meter 92 or meter 207 deviation, plus or minus, from the appropriate standard rate.

The operation of the computer circuits shown in Figures 9 and 10 and the results obtained are substantially the same as the operations described above.

While the particular apparatus herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. In an apparatus of the class described including a collapsible gas container provided with an attachment by which a test subject can inhale gas from and exhale gas into said container, there being a device in communication with said attachment for removing exhaled carbon dioxide; means to evidence the constancy of the rate of gas consumption of the test subject comprising a rate differential electrical circuit including an indicator, and means to control the indication of said indicator including an element variable in accordance with the displacement of gas from said container and an element movable at a constant rate.

2. In an apparatus of the class described including a collapsible gas container provided with an attachment by which a test subject can inhale oxygen gas from and exhale oxygen gas into said container, there being a device in communication with said attachment for removing exhaled carbon dioxide; means to evidence the constancy of the rate of gas consumption of the test subject comprising a rate differential circuit including an indicator, and means to control the indication of said indicator including an element variable in accordance with the displacement of oxygen gas from said container and a second element variable at a constant rate proportional to the average rate of displacement of gas from said container by a normal subject.

3. In an apparatus of the class described including a collapsible gas container provided with an attachment by which a test subject can inhale gas from and exhale gas into said container, there being a device in communication with said attachment for removing exhaled carbon dioxide; means to evidence the rate of gas consumption of the test subject comprising a rate comparator circuit connected to a source of voltage and including a deflecting indicator, the reading of which varies with impressed voltage, and a resistance including two displaceable contacts to which said indicator is connected, one of said contacts being displaceable at a rate corresponding to the rate of displacement of gas from said container and the second of said contacts being displaceable at a constant rate proportional to the average rate of displacement of gas from said container by a normal subject.

4. In an apparatus of the class described including a collapsible gas container provided with an attachment by which a test subject can inhale gas from and exhale gas into said container, there being a device in communication with said attachment for removing exhaled carbon dioxide; means to evidence the rate of gas consumption of the test subject comprising a rate comparator circuit including a deflecting indicator, the reading of which varies with impressed potential, a pair of resistances including movable contacts to which said indicator connects, and sources of potential applied to said resistances, one of said contacts being adjustable on its resistance in proportion to the rate of displacement of gas from said container to vary the potential impressed on one side of said indicator and the second of said contacts being adjusted at a constant rate to vary the potential impressed on the other side of said indicator.

5. In an apparatus of the class described including in combination, a collapsible gas container charged with oxygen and connected to an attachment by which a test subject can inhale oxygen from and exhale oxygen into said container, means in communication with said attachment for removing exhaled carbon dioxide from the system so that said container will collapse as said test subject consumes said oxygen, means to determine the metabolic rate of said test subject comprising an electrical computer circuit of the analog type connected to a source of voltage, said computer circuit including a variable unit adapted to be set in accordance with the rate at which said test subject consumes said oxygen from said container as indicated by the rate of collapse thereof, said variable unit being adapted when thus set to alter the voltage from said voltage source proportionally to said rate of oxygen consumption, and an electrical indicating instrument connected in said circuit responsive to the voltage from said voltage source as altered by said variable unit.

6. In an apparatus of the class described including in combination, a collapsible gas container charged with oxygen and connected to an attachment by which a test subject can inhale oxygen from and exhale oxygen into said container, means in communication with said attachment for removing exhaled carbon dioxide from the system so that said container will collapse as said test subject consumes said oxygen, means to determine the metabolic rate of said test subject comprising an electrical computer circuit of the analog type connected to a source of voltage, said circuit including three variable units the first of which is adapted to be set in accordance with the rate at which said test subject consumes said oxygen from said container as indicated by the rate of collapse thereof to alter the voltage from said voltage source proportionally to said rate of oxygen consumption, the second of which is adapted to be set in accordance with the height of said test subject to alter the voltage from said voltage source in a manner which is a function of said height, and the third of which is adapted to be set in accordance with the weight of said test subject to alter the voltage from said voltage source in a manner which is a function of said weight, and an electrical indicating instrument connected in said circuit responsive to the voltage from said voltage source as altered by the combined effects of said first, second and third variable units.

7. The invention as claimed in claim 6, in which a fourth variable unit is provided in said circuit adapted to be set in accordance with the respiratory quotient of said test subject to alter the voltage from said voltage source, and thus the reading of said indicating instrument, in a manner which is a function of said respiratory quotient.

8. In an apparatus of the class described including a collapsible gas container charged with oxygen and connected to an attachment by which a test subject can inhale oxygen from and exhale oxygen into said container, there being means provided in communication with said attachment for removing exhaled carbon dioxide from the system so that said container will collapse as said test subject consumes said oxygen; means to determine the metabolic rate of said test subject and comprising an electrical computer circuit of the analog type and connected to a source of voltage, said circuit including a variable unit operably associated with said collapsible container for automatic setting to a position determined by the rate of collapse thereof to thus indicate the rate at which said test subject consumes said oxygen from said container, said variable unit being adapted when thus set to alter the voltage from said voltage source in a manner proportional to said rate of oxygen consumption, and an electrical indicating instrument connected in said circuit and responsive to the voltage from said voltage source as altered by said variable unit, said electrical indicating instrument being adapted to be calibrated to read directly in terms of the metabolic rate of said test subject.

9. In an apparatus of the class described including a collapsible gas container charged with oxygen and connected to an attachment by which a test subject can inhale oxygen from and exhale oxygen into said container, there being means provided in communication with said attachment for removing exhaled carbon dioxide from the system so that said container will collapse as said test subject consumes said oxygen; an electrical analog computer circuit to determine the metabolic rate of said test subject and connected to a source of voltage, said circuit including time means associated with said container to determine the length of time required by said test subject to consume a predetermined volume of oxygen therefrom and to alter the voltage from said voltage source in a manner proportional to said length of time, and a voltage responsive instrument connected in said circuit to respond to the voltage from said voltage source as altered by said time means, said instrument being adapted to be calibrated to read directly in terms of the metabolic rate of said test subject.

10. The invention as claimed in claim 9, in which means are provided to start the timing operation of said time means when said test subject commences to consume oxygen from said container, and means are provided to end the timing operation of said time means when said container has collapsed to a predetermined point.

11. The invention as claimed in claim 9, in which said computer circuit additionally includes means adapted to be set in accordance with the height and weight of said test subject and to alter the voltage from said voltage source, and thus the reading of said voltage responsive instrument, in a manner which is a function of said height and weight.

12. The invention as claimed in claim 10, in which the last named means are associated with a movable wall of said container.

13. In an apparatus of the class described including a collapsible gas container charged with oxygen and connected to an attachment by which a test subject can inhale oxygen from and exhale oxygen into said container, there being means provided in communication with said attachment for removing exhaled carbon dioxide from the system so that said container will collapse as said test subject consumes said oxygen; means to determine the metabolic rate of said test subject and comprising an electrical computer circuit of the analog type and connected to a source of voltage, said circuit including a variable unit associated with said container to indicate the volume of oxygen consumed therefrom during a predetermined length of time while said test subject is breathing through said attachment, said variable unit being adapted to alter the voltage from said voltage source in a manner proportional to said volume of oxygen consumed during said predetermined length of time, and an electrical indicating instrument connected in said circuit to respond to the voltage from said voltage source as altered by said variable unit.

14. The invention as claimed in claim 13, in which additional variable units are provided and adapted to be set in accordance with the height and weight of said test subject and to alter the voltage from said voltage source, and thus the reading of said indicating instrument, as a function of said height and weight.

15. The invention as claimed in claim 13, in which additional variable units are provided and adapted to be set in accordance with the pressure and temperature of the ambient atmosphere and to alter the voltage from said voltage source, and thus the reading of said indicating instrument, in a manner proportional to said ambient temperature and pressure.

16. Apparatus for determining the metabolic rate of a test subject, which comprises, in combination, a collapsible gas container, an attachment connected to said container through which said test subject can inhale from and exhale into said container, absorption means for removing exhaled carbon dioxide from the system, means to charge said container with oxygen, an electrical analog computer circuit associated with said container and adapted to be connected to a source of voltage, said circuit including a variable unit adapted to be set in accordance with the rate at which said test subject consumes oxygen from said container as indicated by the rate of collapse thereof, said variable unit being adapted when thus set to alter the voltage from said voltage source proportionally to the rate of oxygen consumption, and an electrical indicating instrument connected in said circuit response to the voltage from said voltage source as altered by said variable unit.

17. The invention as claimed in claim 16, in which said circuit additionally includes means adapted to be set in accordance with the height and weight of said test subject to alter the voltage from said voltage source, and thus the reading of said electrical indicating instrument, in a manner which is a function of said height and weight, said height and weight means being so related to said variable unit as to prevent interaction therebetween.

18. Apparatus for determining the metabolic rate of a test subject, which comprises, in combination, a collapsible gas container, an attachment connected to said container through which said test subject can inhale from and exhale into said container, absorption means communicating with said attachment for removing exhaled carbon dioxide from the system, means to charge said container with a predetermined weight of oxygen gas, said charging operating to increase the size of said collapsible container from a predetermined reference condition to an enlarged condition, means to measure the time required by said test subject to consume oxygen from said container until it collapses from said enlarged condition to said predetermined reference condition, thereby indicating complete consumption of said predetermined weight of oxygen gas, and computer means adapted to be set with said time required to consume said predetermined weight of oxygen gas and to indicate the metabolic rate of said test subject.

19. Apparatus for determining the metabolic rate of a test subject, which comprises, in combination, a collapsible gas container, an attachment connected to said container through which said test subject can inhale from and exhale into said container, means for removing exhaled carbon dioxide from the system, means to charge said container with a predetermined weight of oxygen gas, said charging operating to increase the size of said collapsible container from a predetermined reference condition to an enlarged condition, means to measure the time required by said test subject to consume oxygen from said container until it collapses from said enlarged condition to said predetermined reference condition, thereby indicating complete consumption of said predetermined weight of oxygen gas, and an electrical analog computer circuit connected to a source of voltage and comprising a plurality of variable units each adapted to alter the voltage from said voltage source in accordance with its setting, one of said units being adapted to be set with said time required to consume said predetermined weight of oxygen, others of said units being adapted to be set with the height and weight of said test subject, and a voltage responsive meter connected to the output of said circuit for response to the output voltage thereof.

20. Apparatus for determining the metabolic rate of a test subject, which comprises, in combination, a collapsible gas container, an attachment connected to said container through which said test subject can inhale from and exhale into said container, means for removing exhaled carbon dioxide from the system, means to charge said container with a predetermined weight of oxygen gas, said charging operating to increase the size of said collapsible container from a predetermined reference condition to an enlarged condition, a constant speed motor adapted to be started when said subject commences to consume said predetermined weight of oxygen gas, and to be stopped when said container collapses from said enlarged condition to said predetermined reference condition, thereby indicating complete consumption of said predetermined weight, and computer means including an element driven by said motor for setting to a value determined by the time period during which said motor operates and thus the time period required by said test subject to consume said predetermined weight.

21. The invention as claimed in claim 20, in which valve means are provided to control communication between said attachment and container, electric circuit means are associated with said valve means and motor to effect starting of said motor when said valve means is shifted to a position establishing communication between said attachment and container, and means responsive to the return of said container to said predetermined reference condition are provided to effect stopping of said motor upon complete consumption of said predetermined weight of oxygen.

22. In an apparatus for determining the metabolic rate of a test subject, a collapsible gas container, an attachment connected to said container through which said test subject can inhale from and exhale into said container, absorption means communicating with said attachment for removing exhaled carbon dioxide from the system, means to charge said container with a predetermined weight of oxygen gas, said charging operating to increase the size of said container from a predetermined reference condition to an enlarged condition, a motor driven timer, valve means to control communication between said attachment and container, means responsive to shifting of said valve means to a position effecting communication between said attachment and container for starting operation of said timer, and means responsive to the return of said container to said predetermined reference condition for stopping operation of said timer, whereby said timer is caused to indicate the length of time required by said test subject to consume said predetermined weight of oxygen.

23. The invention as claimed in claim 22, in which an electrical analog computer circuit is provided in the form of a plurality of cascaded potentiometers, said circuit being connected at its input to a source of voltage and at its output to a voltmeter calibrated to read metabolic rate in units of energy per unit of size per unit of time, one of said potentiometers being connected to said timer for automatic setting thereby, and others of said potentiometers being set in predetermined positions to represent respectively the height and weight of said test subject, whereby the reading of said voltmeter indicates the metabolic rate of said test subject.

24. In a device for determining the metabolic rate of a test subject, a bellows having a fixed wall and a movable wall, a face mask for mounting on said test subject, breathing conduit means connecting said face mask and bellows in closed circuit relation, carbon dioxide absorbing means in said breathing conduit means, means to charge said bellows with a predetermined weight of oxygen gas and thus effect shifting of said movable wall from an initial reference position to an expanded position, timer means, valve means in said breathing conduit means and movable from a first position effecting communication between said face mask and the ambient atmosphere to a second position effecting communication between said face mask and bellows, means operatively relating said valve means and timer means to effect commencement of timing operation of the latter upon movement of said valve means to said second position, and means responsive to the return of said movable bellows wall to said initial reference position to effect cessation of timing operation of said timer means.

25. In a device for determining the metabolic rate of a test subject, a bellows having a fixed wall and a movable wall, a face mask for mounting on said test subject, breathing conduit means connecting said face mask and bellows in closed circuit relation, carbon dioxide absorbing means in said breathing conduit means, means to charge said bellows with a predetermined weight of oxygen gas and thus effect shifting of said movable wall from an initial reference position to an expanded position, timer means, valve means in said breathing conduit means and movable from a first position effecting communication between said face mask and the ambient atmosphere to a second position effecting communication between said face mask and bellows, a computer including a time insertion element, means responsive to shifting of said valve means to said second position to effect driving of said time insertion element by said timer means, and means responsive to the return of said movable bellows wall to said initial reference position to effect cessation of driving of said time insertion element by said timer means.

26. The invention as claimed in claim 25, in which said timer means comprises a constant speed motor mechanically connected to drive said time insertion element, the latter being a potentiometer of the manually reset type.

27. In combination, an apparatus for determining the metabolic rate of a human subject comprising, an attachment by which the test subject can inhale gas, a source containing a predetermined quantity of oxygen gas connected to said attachment, means communicating with said attachment for removal of exhaled carbon dioxide, and an electrical analog computer circuit connected to a source of voltage and including an indicating instrument connected to the output of said circuit, said circuit comprising a plurality of variable units connected to cascade arrangement to control the indication of said instrument, said plurality of units including units adapted to be manually preset to positions related to and of a value to provide effects on the indication of said instrument proportional to the effect of the subject's weight and height, and a variable unit responsive to the time required by the subject to consume said predetermined quantity of gas.

28. The construction recited in claim 27 characterized in that said plurality of units include a unit adapted to be preset to a position related to and of a value to provide an effect on the indication of said instrument proportional to the standard rate appropriate to subject's age and sex.

29. The construction recited in claim 27 characterized in that said source comprises a replaceable cartridge of oxygen under pressure and which contains a predetermined volume of oxygen when at standard temperature and pressure.

30. The construction recited in claim 28 characterized in that switch means are provided in said circuit selectively to include and to exclude said unit related to and of a value to provide an effect on the indication of said instrument proportional to the standard rate appropriate to subject's age and sex.

References Cited in the file of this patent

UNITED STATES PATENTS

| | | |
|---|---|---|
| 1,988,221 | Soskin | Jan. 15, 1935 |
| 2,557,070 | Berry | June 19, 1951 |